(12) United States Patent
Leung

(10) Patent No.: US 6,487,179 B1
(45) Date of Patent: *Nov. 26, 2002

(54) METHODS FOR PREVENTING AND DETECTING MESSAGE COLLISIONS IN A HALF-DUPLEX COMMUNICATION SYSTEM

(75) Inventor: Nikolai K. N. Leung, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/677,499

(22) Filed: Oct. 2, 2000

Related U.S. Application Data

(63) Continuation of application No. 08/857,343, filed on May 16, 1997, now Pat. No. 6,185,195.

(51) Int. Cl.[7] .................................................. H04B 3/20
(52) U.S. Cl. ....................................... 370/286; 370/242
(58) Field of Search ................................. 370/286, 201, 370/289, 290, 291, 292, 252, 249, 276, 216, 229, 230, 241, 242, 296; 379/406, 410

(56) References Cited

U.S. PATENT DOCUMENTS

| | | | | |
|---|---|---|---|---|
| 4,644,108 A | * | 2/1987 | Crouse et al. | 379/406.14 |
| 4,897,831 A | * | 1/1990 | Negi et al. | 370/249 |
| 5,596,439 A | * | 1/1997 | Dankberg et al. | 359/161 |
| 5,609,155 A | * | 3/1997 | Guracar | 600/453 |
| 5,664,011 A | * | 9/1997 | Crochiere et al. | 379/406.08 |
| 5,668,871 A | * | 9/1997 | Urbanski | 379/406.07 |
| 5,734,678 A | * | 3/1998 | Pabeth et al. | 375/240 |
| 6,049,548 A | * | 4/2000 | Bruno et al. | 370/445 |
| 6,185,195 B1 | * | 2/2001 | Leung | 370/286 |

\* cited by examiner

*Primary Examiner*—Dang Ton
*Assistant Examiner*—Brian Nguyen
(74) *Attorney, Agent, or Firm*—Philip Wadsworth; Kent D. Baker; Kyong H. Macek

(57) ABSTRACT

In a half-duplex communication system in which additional delays in the communication channel may cause a message collision between a message and a response, a collision detector is utilized to prevent and detect message collisions. The collision detector determines if a response may be transmitted from the communication device while it is receiving the current message. If no response is expected, the collision detector is placed into a train mode. If a response is possible, the collision detector is placed into the monitor mode. In the monitor mode, the collision detector monitors the communication channel and determines if a message collision has occurred during transmission of the message. A detection of a message collision causes retransmission of the message or possibly a new message at a later time after it has been determined that the communication channel is clear.

9 Claims, 7 Drawing Sheets

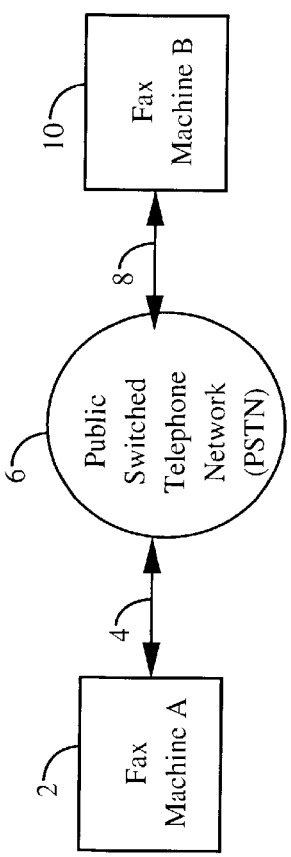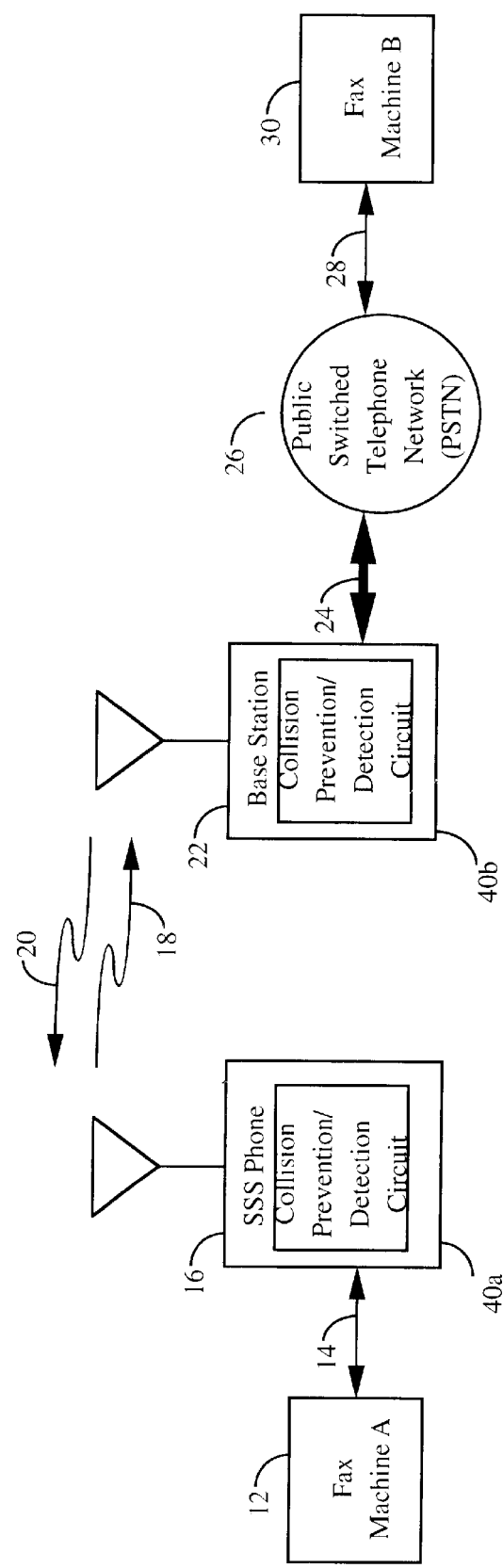

METHODS FOR PREVENTING AND DETECTING MESSAGE COLLISIONS IN A HALF-DUPLEX COMMUNICATION SYSTEM

CROSS REFERENCE

This application is a continuation application of application Ser. No. 08/857,343, filed May 16, 1997, now U.S. Pat. No. 6,185,195, entitled "METHODS FOR PREVENTING AND DETECTING MESSAGE COLLISIONS IN A HALF-DUPLEX COMMUNICATION SYSTEM."

BACKGROUND OF THE INVENTION

I. Field of the Invention

The present invention relates to data transmission. More particularly, the present invention relates to novel and improved methods for preventing and detecting message collisions in a half-duplex communication system.

II. Description of the Related Art

In a half-duplex communication system, multiple communicating devices are connected to a single communication channel. One such system is a fax communication system in which two fax machines send messages across a telephone line. Half-duplex devices such as fax machines are capable of only transmitting or receiving messages at any particular instant. These devices cannot transmit and receive data simultaneously. If two devices transmit signals toward each other simultaneously and neither device is listening, the devices will not receive the other's message. This event is known as a message collision.

Most half-duplex communication systems are designed to minimize message collisions to improve the quality of the communications. These systems employ a variety of schemes to avoid message collisions. Some of these schemes require a certain quality in the communication channel. As the communication channel deteriorates, there may be an increased likelihood of message collisions. Other schemes use special timing and synchronization to avoid message collisions. For these schemes, increased delays in the communication channel may cause the system to fail.

A fax communication system is an example of a half-duplex communication system which relies on the timing and synchronization between the two communicating fax machines to avoid message collisions. The fax machines communicate with each other through a standard public switched telephone network (PSTN) channel which has known channel quality and delay characteristics. When a non-standard PSTN channel, such as a digital communication system or a satellite link, is inserted between the two fax machines the increased transmission delays can cause the fax interactions to fail because of message collisions.

A digital communication system or satellite link is incorporated with the half-duplex communication system to extend the range of coverage, allow mobility in the communicating devices, and increase interconnectivity between different communicating devices. An exemplary digital communication system which can be used in conjunction with a fax communication system is a wireless code division multiple access (CDMA) system operating in the cellular or personal communication system (PCS) band or a GLOBAL-STAR satellite communication system. These digital communication systems have inherent processing delays resulting from the large amount of digital signal processing and from transmission delays. These digital communication systems also employ central base stations to combine or multiplex signals from many communicating devices into a common transmission signal. The resultant overall delay can be both intolerably long and unpredictable.

Throughout the specification of the present invention, a syntax structure is maintained to clarify the discussion of the invention. In describing communications between two devices, the term 'message' is used to denote a communication from a source device to a destination device. This 'message' may or may not be retransmitted by the source device. The term 'response' is used to denote a communication from the destination device to the source device as the result of the earlier transmitted 'message'.

In a half-duplex communication system which utilizes a timing and synchronization scheme to avoid message collision, a source device desiring to communicate with a destination device on the same channel initiates the communication by sending out a message and waiting for a response from the destination device. After a predetermined length of time passes, if no response is received, the source device retransmits the message. This process is repeated for a specified number of times or until a response is received.

For a standard Group 3 fax communication system, the timing and synchronization between fax machines conform to behavior as specified in "ITU-T Recommendation T.30: Procedures for Document Facsimile Transmission in the General Switched Telephone Network", hereinafter referred to as the T.30 fax protocol. The T.30 fax protocol uses a number of modulation techniques for transmission of forward message data. In particular, parameter negotiation and handshaking between fax machines is accomplished using the modulation technique specified in "CCITT Recommendation V.21: 300 bps Duplex Modem Standard for use in the General Switched Telephone Network (GSTN)". The handshaking establishes the proper mode of communications between the fax machines.

For a T.30 fax system, a calling fax machine initiates a call by dialing the called fax machine and sending a calling tone (CNG). The called fax machine detects the incoming call and sends a called station identification tone (CED) back to the calling fax machine. The called fax machine then sends its digital identification signal (DIS) to the calling fax machine to inform the calling fax machine of its capabilities. Upon detection of the DIS signal, the calling fax machine sends a digital command signal (DCS) to inform the called fax machine of the capabilities the calling fax machine plans to use.

Other messages in addition to the above described initiation signals also take place between the fax machines during a call. For example, the training signals, information messages and termination messages are also part of a typical fax call.

A calling fax machine and a called fax machine send many messages between each other during a call. Messages are sent from either the calling fax machine or the called fax machine at various stages in a fax call. Since both calling and called fax machines can initiate messages, the discussion below describes the communications in terms of a source fax machine that initiates a message to a destination fax machine and a destination fax machine that reacts with a response back to the source fax machine without reference to calling or called fax machines. Some of the messages by the source fax machine must be repeated if no response is received for these messages.

The T.30 fax protocol specifies the procedure which must be followed when initiating a call between the fax machines. For example, the sequence and format of the CNG, CED, DIS, and DCS messages are specifically defined. The T.30 fax protocol also defines the messages which must be repeated if no response is received. Therefore, by monitoring the message format and having a priori knowledge of the signaling sequence, it is possible to determine which message will be repeated. A repeated message can be determined by analyzing the message and the state in a fax call in which it is received, as per the T.30 fax protocol.

To accommodate for unfavorable channel conditions, the T.30 fax protocol requires that certain unanswered messages between fax machines be repeated. If the source fax machine sends such a message to the destination fax machine, the source fax machine expects a response from the destination fax machine within a specified period of time. If no response is received after the specified period of time, the T.30 fax protocol requires the source fax machine to retransmit the message. The retransmissions continue until a response from the destination fax machine is received or an excessive number of attempts have been made.

The DIS and certain messages between the fax machines are repeated at a specified repetition interval if no response is detected. The T.30 fax protocol defines the shortest repetition interval within which a retransmission is allowed. For example, the T.30 fax protocol specifies the repetition interval for a fax machine operating in automatic mode to be 3.0 sec±0.45 sec. This means that a fax machine conforming to the T.30 fax protocol should not retransmit a message within 2.55 sec of the prior message. Therefore, if such a fax machine receives a response within the shortest repetition interval of 2.55 sec, no collision will occur.

Under this T.30 fax timing scheme, long transmission delays in the communication channel can cause message collisions. In one scenario, the source fax machine transmits a message to the destination fax machine and, because of the transmission delays, the response from the destination fax machine takes more time than the repetition period to reach the source fax machine. Since the source fax machine does not receive the response in time, it retransmits the message. If the response from the destination fax machine arrives at the same time the source fax machine is retransmitting the message, a message collision results and the response will not be received by the source fax machine.

In an exemplary fax communication system which utilizes a standard PSTN communication system, the communication channel is typically an RJ-11 interface. The RJ-11 interface is known in the art and is composed of a pair of wire for carrying a differential signal. The use of a differential signal improves performance because of the superior noise immunity over a single-ended signal. The RJ-11 interface carries all communications between the fax machines on the same wire pair.

The 2-to-4 wire converter, a hybrid circuit also known in the art, is used to decouple the messages and responses on the RJ-11 interface. The 2-to-4 wire converter is composed of one differential pair of wire on the primary side and two differential pairs of wire on the secondary side. The differential pair of wire on the primary side connects to the RJ-11 interface which, in turn, connects to a destination fax machine. The two differential pairs of wire on the secondary side connect to a forward channel and a reverse channel. The forward channel carries messages from a source device to the destination fax machine through the 2-to-4 wire converter. Likewise, the responses from the destination fax machine are coupled to the reverse channel through the 2-to-4 wire converter. Ideally, only messages should appear on the forward channel and only responses should appear on the reverse channel. Because of imperfections in the implementation of the 2-to-4 wire converter, small but distorted versions of the messages appear on the reverse channel and vice versa. A collision prevention/detection circuit must be able to operate with these known imperfections in the 2-to-4 wire converter.

The inability to account for unpredictable and long delays renders the communications between Group 3 fax machines on non-standard PSTN communication channel unreliable. A method is needed to detect message collisions regardless of the amount of channel delay and regardless of the source of the interfering signal.

SUMMARY OF THE INVENTION

The present invention is a novel and improved method for detecting message collisions in a half-duplex communication system. A 2-to-4 wire converter is interposed between the present invention and the communication device. A message on the forward channel is routed to the communication device through the 2-to-4 wire converter. A response from the communication device is routed to the reverse channel through the 2-to-4 wire converter. Because of imperfections in the 2-to-4 wire converter, a portion of the message on the forward channel also appears on the reverse channel.

It is an object of the invention to detect message collisions in a half-duplex communication system by utilizing an echo canceller based collision detector. During the training period, a message is transmitted to the communication device on the forward channel. Because of imperfections in the 2-to-4 wire converter, a portion of the message appears on the reverse channel as an echo. The message is also passed through an adaptive filter to produce an estimate of the echo. During the training period, the echo canceller monitors the error signal between the echo and the estimate of the echo and adjusts the frequency response of its filter to minimize the error signal. During the message transmission period, the adaptive filter is fixed and the echo canceller measures the error signal. If a response appears on the reverse channel during transmission of the message, the invention declares that a message collision has occurred and outputs a status signal indicating the condition.

It is another object of the invention to detect message collisions in a half-duplex communication system by utilizing a signal parameter estimator. During the training period, the signal parameter estimator measures the spectral energy of the echo on the reverse channel. The signal parameter estimator then creates a set of threshold values based on the measured energy of the echo. During the message transmission period, the signal parameter estimator compares the measured spectral energy of the signal on the reverse channel and compares the measured values to the set of threshold values. If the measured values fall outside the threshold range, a message collision is declared and the signal parameter estimator outputs a status signal indicating the condition.

The foregoing, together with other objects, features and advantages of this invention, will become more apparent when referring to the following specification, claims and the accompanying drawings.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 1 is a block diagram of a standard half-duplex PSTN communication system in the prior art;

FIG. 2 is a block diagram of a half-duplex PSTN communication system which includes a digital communication system;

DETAILED DESCRIPTION OF THE PREFERRED EMBODIMENTS

Figure 3:
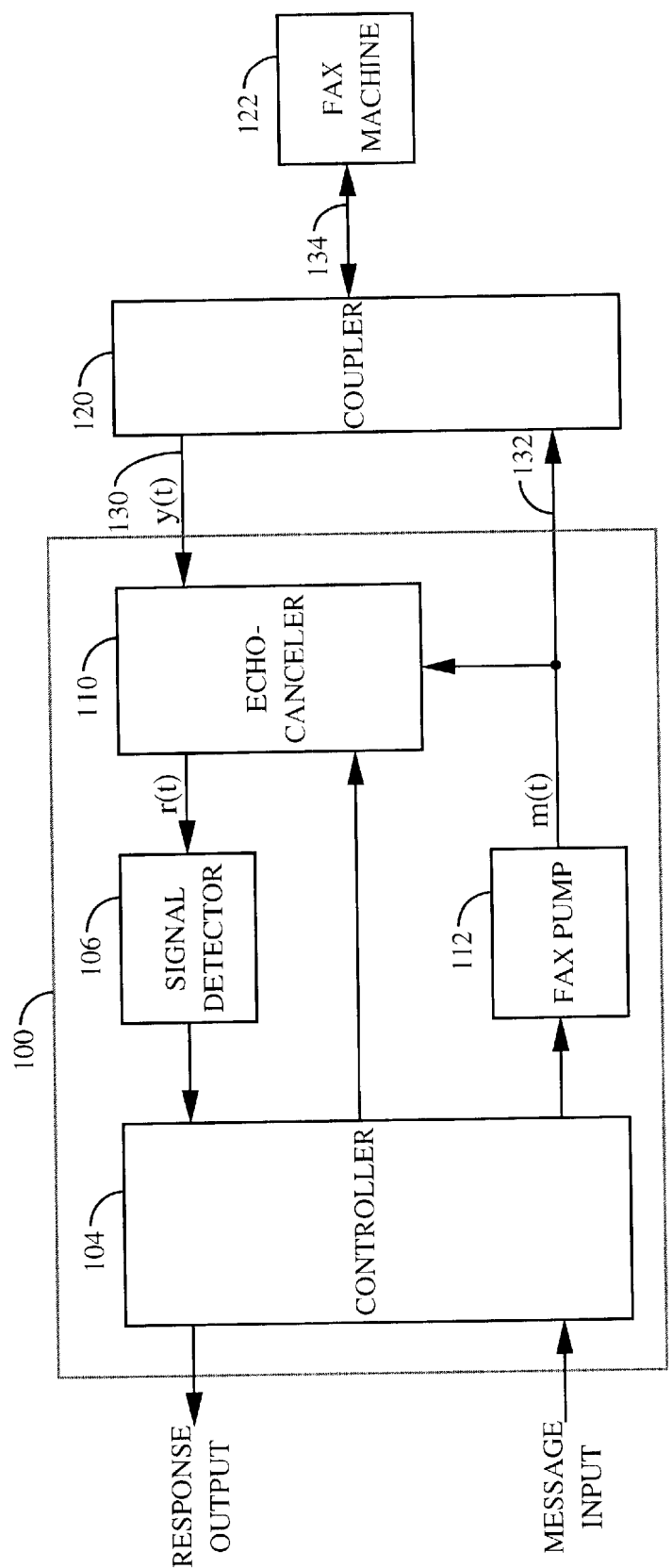
FIG. 3 is a block diagram of an echo canceller based collision prevention/detection circuit.

An exemplary half-duplex communication system of the prior art is shown in FIG. 1. One such system is a standard fax communication system. In this fax communication system, fax machine A 2 communicates with fax machine B 10 through public switched telephone network (PSTN) 6 via communication channels 4 and 8. Fax machine A 2 connects to PSTN 6 via communication channel 4. PSTN 6 connects to fax machine B 10 via communication channel 8. PSTN 6 acts as a switch to connect communication channel 4 to communication channel 8 to enable communications between the fax machines. Communication channels 4 and 8 are typically standard RJ-11 interfaces. The characteristics and delays of the RJ-11 interfaces and PSTN 6 are well defined and accounted for in the T.30 fax protocol.

A communication system which employs a wireless communication system is illustrated in FIG. 2. In this communication system, a wireless communication system is connected in series with communication channels 14 and 24 between fax machine A 12 and fax machine B 30. The digital communication system can be a terrestrial wireless CDMA system or a satellite communication system such as the GLOBALSTAR system. Fax machine A 12 communicates with single subscriber system (SSSs) phone 16 through communication channel 14. In the preferred embodiment, communication channel 14 is an RJ-11 interface. SSS phone 16 demodulates and digitally processes the data and transmits the resultant output through over-the-air communication channel 18. Over-the-air communication channel 18 can be a satellite link or a terrestrial wireless link. Base station 22 receives the over-the-air signal, processes and remodulates the signal, and sends the data to PSTN 26 through communication channel 24. Communication channel 24 is typically a standard T1/E1 line or any other similar transmission medium. PSTN 26 routes the data to FAX machine B 30 through communication channel 28.

The digital signal processing in SSS phone 16 and base station 22 delays the communications between fax machine A 12 and fax machine B 30. Signal transmissions through over-the-air communication channels 18 and 20 add to the overall delay. The total delay causes a message originating from the source fax machine to be received later by the destination fax machine. Likewise, a response from the destination fax machine arrives at the source fax machine at a later time.

In the exemplary embodiment, collision prevention/detection circuits 40a and 40b residing within the half-duplex communication system are utilized to detect message collisions between fax machine A 12 and fax machine B 30. Collision prevention/detection circuit 40a resides in SSS phone 16 and collision prevention/detection circuit 40b resides in base station 22. In the preferred embodiment, one collision prevention/detection circuit 40 is assigned to each of the two communicating fax machines.

In a call between fax machines, a fax machine behaves as a source fax machine for some messages and as a destination fax machine for other messages. In the present invention, it is only necessary to describe the communication between collision prevention/detection circuit 40 and a destination fax machine without regard to the source fax machine. Limiting the discussion to the collision prevention/detection circuit and the destination fax machine allows a focused discussion of the present invention without loss of scope.

I. First Embodiment

In the first embodiment, an echo canceller based collision detector is utilized to detect message collisions. An exemplary echo canceller based collision detector is shown in FIG. 3. In this embodiment, collision detector 100 connects in series with the communication channel between the fax machines. Collision detector 100 resides within SSS phone 16 and/or base station 22 (see FIG. 2) and is labeled as collision prevention/detection circuit 40 in FIG. 2. In the preferred embodiment, one collision detector 100 is assigned to each of the two communication fax machines 12 and 30. For clarity, the following discussion is focused on the fax communication between collision prevention/detection circuit 40a and fax machine A 12 in FIG. 2, which are renumbered as collision detector 100 and fax machine 122 in FIG. 3. The same interaction also occurs between collision prevention/detection circuit 40b and fax machine B 30.

Referring to FIG. 3, echo canceller based collision detector 100 resides within SSS phone 16. Collision detector 100 receives messages from SSS phone 16 and sends responses to SSS phone 16. Collision detector 100 connects to coupler 120 through forward channel 132 and reverse channel 130. Coupler 120 can be a 2-to-4 wire converter or any other hybrid coupler capable of performing the function herein described and is typically an adapter connected to the interface of SSS phone 16. Fax machine 122 connects to coupler 120 through communication channel 134 such as an RJ-11 interface. Coupler 120 couples the messages on forward channel 132 to fax machine 122 and the responses from fax machine 122 to reverse channel 130.

Within collision detector 100, controller 104 connects to fax pump 112. Controller 104 may be implemented in a microprocessor, a microcontroller, a digital signal processor (DSP) chip, or an ASIC programmed to perform the function as described. Fax pump 112 modulates the digital data from controller 104 and transmits the modulated signal as messages on forward channel 132. Echo canceller 110 connects to controller 104, reverse channel 130, and forward channel 132. Echo canceller 110 receives a control signal from controller 104 commanding echo canceller 110 into a train mode or a monitor mode. Signal detector 106 is interposed between echo canceller 110 and controller 104. Signal detector 106 monitors the error signal from echo canceller 110 and outputs a status signal indicating the presence or absence of a message collision, based on the error signal from echo canceller 110, to controller 104.

If controller 104 needs to transmit a message to fax machine 122, controller 104 first determines if communication channel 134 connected to fax machine 122 is clear. This determination is based on the status signal from signal detector 106. If communication channel 134 is not clear, controller 104 waits for the channel to clear before proceeding.

Based on the type of the message to be sent to fax machine 122 and its a priori knowledge of the T.30 fax protocol, controller 104 knows whether a response will be forthcoming from fax machine 122 as the result of receiving the message. If no response is expected from fax machine 122, a message collision is highly unlikely and controller 104 sends a control signal to echo canceller 110 to command echo canceller 110 into the train mode. Controller 104 then sends the message data to fax pump 112. Fax pump 112 receives the message data from controller 104, modulates the data, and transmits the modulated signal as a message on forward channel 132. A predominant portion of the message is coupled to fax machine 122 through coupler 120. Because of imperfections in the implementation of coupler 120, an echo y(t) of the message appears on reverse channel 130. For a linear system, the echo is a small, time delayed, and amplitude distorted version of the message. The echo appears on reverse channel 130 as the result of internal coupling within coupler 120. Since it has been determined previously that communication channel 134 is clear before the transmission of the message, only the echo is present on reverse channel 130.

The message m(t) is also passed through an adaptive filter which resides within echo canceller 110. The design and implementations of echo cancellers are well known in the art. The exemplary embodiment of echo canceller 110 is described in detail in U.S. Pat. No. 5,307,405, entitled "NETWORK ECHO CANCELLER" which is assigned to the assignee of the present invention and incorporated by reference herein. The adaptive filter adjusts its frequency response characteristics, e.g. its amplitude and delay response versus frequency, such that the filter output is a close estimate of the echo on reverse channel 130. The adaptive filter minimizes the error r(t) between the echo and the estimate of the echo by adjusting the frequency response of the filter according to an adaptive procedure. The adaptive procedure can be a least-mean-square (LMS) algorithm or any other signal estimation technique suitable for the task herein disclosed. When transmission of the message is complete, controller 104 terminates the training period and the frequency response of the adaptive filter is fixed. No adjustment is made on the adaptive filter frequency response until the next training period.

During transmission of messages from controller 104 to fax machine 122, controller 104 sends a control signal to echo canceller 110 to place echo canceller 110 into the monitor mode. In this mode, echo canceller 110 estimates the echo on reverse channel 130 by filtering the message with the adaptive filter. Since echo canceller 110 has just been trained, the estimate at adaptive filter 116 output is a close approximation of the echo on reverse channel 130. As the result, the error signal r(t) between the echo estimate and the echo will be a small signal. Signal detector 106 compares the error signal to a predetermined threshold and outputs a status signal to controller 104 indicating that the error signal is below the predetermined threshold and that no message collision has occurred.

Due to excessive transmission delays or incorrect synchronization, fax machine 122 may transmit a response during transmissions of the messages. In this instant, the signal on reverse channel 130 is composed of the echo of the message and the response from fax machine 122 which are coupled to reverse channel 130 by coupler 120. Echo canceller 110 is only able to estimate the echo of the message. Therefore, the error signal r(t) between the echo estimate and the signal on reverse channel 130 will be composed predominately of the response from fax machine 122. Signal detector 106 compares the error signal against the predetermined threshold. If the error signal exceeds the predetermined threshold because of the presence of the response from fax machine 122, signal detector 106 outputs a status signal to controller 104 indicating that a large signal is present on communication channel 134 and that there is a high likelihood of a message collision. Controller 104, upon receipt of the status signal indicating a high likelihood of a message collision, terminates transmission of the message, continuously monitors the status signal, and retransmits the message at a later time after it has been determined that communication channel 134 is clear.

By utilizing an echo canceller based collision detector to detect message collisions, communications between fax machines in the presence of long channel delays and/or deteriorating channel conditions is greatly improved.

Figure 4:
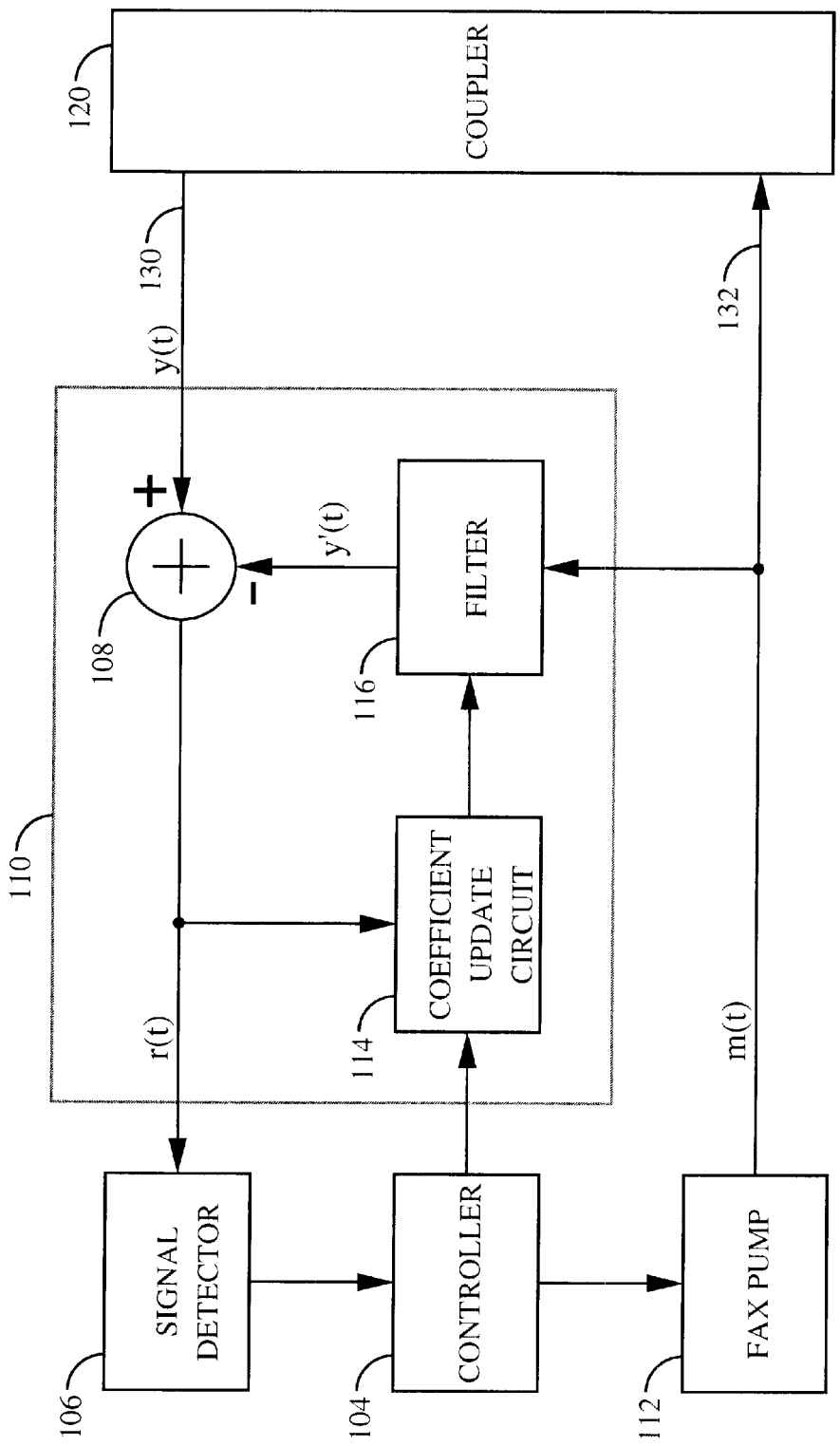
FIG. 4 is a block diagram of an exemplary echo canceller circuit.

A simplified version of the exemplary echo canceller is shown in FIG. 4. As shown in the figure, a message m(t) is transmitted by fax pump 112 to fax machine 122 on forward channel 132 through coupler 120. Coupler 120 directs a predominant portion of the message from forward channel 132 to communication channel 134. The message is also coupled to reverse channel 130 due to internal coupling within coupler 120. As a result, an echo is introduced on reverse channel 130.

Echo canceller 110 estimates the echo on reverse channel 130 based on the message. Filter 116 is applied to the message to produce an estimate of the echo. Different filter implementations such as analog filters, non-linear filters, or digital filters such as a finite impulse response (FIR) or an infinite impulse response (IIR) filter synthesized in hardware or software can also perform the filtering function and are within the scope of the present invention. In the exemplary embodiment, filter 116 is an FIR filter. Summer 108 is a difference amplifier with inputs connected to reverse channel 130 and FIR filter 116. Summer 108 can be implemented with a differential amplifier or other signal combining circuits. Summer 108 outputs an error signal that is the difference between the signal y(t) on reverse channel 130 and the estimate y'(t) of the echo from FIR filter 116.

The coefficients of FIR filter 116 are provided by coefficient update circuit 114. Coefficient update circuit 114 receives the error signal r(t) from summer 108 and calculates a set of filter coefficients for FIR filter 116 which minimize the error signal r(t). The coefficient calculation can be performed by one of any number of adaptive routines. In the preferred embodiment, the coefficient calculation is performed by a least-mean-square (LMS) algorithm that is known in the art. Coefficient update circuit 114 also receives the control signal from controller 104 which commands coefficient update circuit 114 into the train mode or the monitor mode. Training is enabled only during the transmission of the message and only after controller 104 has determined that no other interfering signals, such as a response, is present on communication channel 134 (see FIG. 3). Coefficient update circuit 114 only updates the filter coefficients during the training period. During the monitor mode, coefficient update circuit 114 is disabled and the previously calculated filter coefficients are maintained by FIR filter 116.

The accuracy of the echo estimate is dependent on the FIR filter implementation. More filter taps and greater mathematical precision in the implementation of the FIR filter allow for a more accurate estimate of the echo at the expense of greater complexity. As a minimum, the echo must be canceled sufficiently such that the resulting error signal r(t) consistently falls below the predetermined threshold.

The predetermined threshold is determined by system considerations. The threshold must be set low enough to enable detection of all responses from fax machine 122. However, setting the threshold too low may result in erroneous indications of message collisions. In the preferred embodiment, the threshold is set at a level which, if exceeded by the response, would cause incorrect reception of the message by fax machine 122 but which does not erroneously indicate message collisions.

In the preferred embodiment, signal detector 106 uses the techniques described in U.S. Pat. No. 5,892,816, hereinafter the '816 patent, issued on Apr. 6, 1999, entitled "METHOD AND APPARATUS FOR DETECTING FACSIMILE TRANSMISSION", assigned to the assignee of the present invention and incorporated by reference herein, to detect the presence of fax messages in the error signal r(t). V.21 messages are transmitted using binary frequency shift keying (BFSK) modulated signals where 1650 Hz represents binary '1' and 1850 Hz represents binary '0'. As described in the '816 patent, the error signal r(t) is filtered by two notch filters, one centered at 1650 Hz and the second centered at 1850 Hz. The outputs from the notch filters are separately squared and accumulated over a predetermined interval to obtain energy values. Signal detector 106 analyzes the present and prior energy values, e.g. comparing these energy values to a known energy signature. If the energy values conform to a predetermined criteria, e.g. as specified in the '816 patent, a message collision is indicated on the status signal sent to controller 104

In an alternative embodiment, signal detector 106 compares the error signal r(t) against the predetermined threshold. In this embodiment, signal detector 106 can be implemented with a comparator or other signal comparison circuits. In one embodiment, signal detector 106 compares the error signal to one predetermined threshold. If the error signal exceeds the predetermined threshold, a message collision is indicated on the status signal sent to controller 104. In another embodiment, multiple thresholds are utilized to indicate message collisions with varying degree of certainty. An error signal exceeding each of the multitude of thresholds would be equated with a different probability of message collision. These and other variations of signal detector 106 are within the scope of the present invention.

Figure 5:
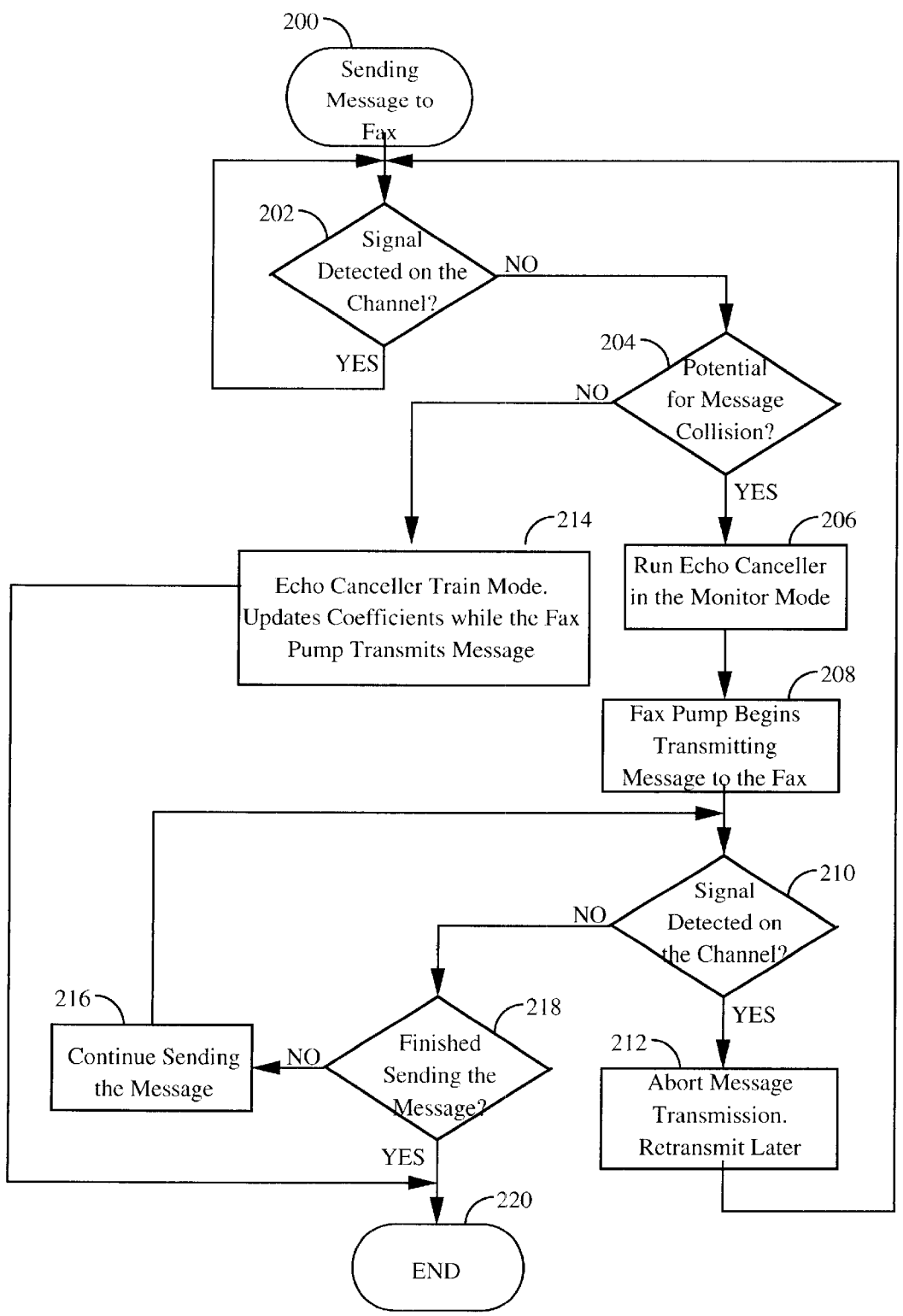
FIG. 5 is a flow diagram of an echo canceller based collision detection method of the present invention.

A flow diagram describing the operation of the echo canceller based collision detector of the first embodiment is shown in FIG. 5. Initially, the collision detector has a message to send to the fax machine at state 200. The collision detector first checks the communication channel connected to the fax machine to determine whether the channel is clear at step 202. If the channel is not clear, the collision detector continues to monitor the channel and will proceed only after it has been determined that the channel has become clear.

At step 204, the collision detector analyzes the message to determine whether it is possible to receive a response from fax machine 122 while fax pump 112 is transmitting the message. The collision detector is able to determine this based on its knowledge of the type of the message to be transmitted and its a priori knowledge of the T.30 fax protocol. If no response from the fax machine is expected, the potential for message collision is minimal. The echo canceller is then placed into the train mode while the message is being transmitted by the fax pump to the fax machine at step 214.

In the train mode, the echo canceller attempts to minimize the difference between the echo on the reverse channel and an estimate of the echo. The estimate of the echo is derived by filtering the message with an adaptive filter. The echo canceller attempts to minimize the error of the estimate by adjusting the filter characteristics. The train mode continues until transmission of the message is complete. Upon completion of the transmission, the collision detector terminates the process at state 220.

If in step 204, the collision detector determines that it is possible to receive a response from fax machine 122 while fax pump 112 is transmitting the message to it, the echo canceller is commanded into the monitor mode at step 206. The collision detector then directs the fax pump to transmit the message to the fax machine at step 208. While transmission continues, the collision detector enters into a loop to continually check for message collision during the transmission of the message. The first step in the loop involves monitoring the signal on the reverse channel at step 210 for an interfering signal from the communication channel. The interfering signal can be a response from the fax machine. If no interfering signal is detected, the collision detector then determines if the transmission of the message has been completed at step 218. If transmission is not complete, collision detector continues to transmit the message at step 216 and returns to step 210. Upon determination that the complete message has been transmitted, the process terminates at state 220.

If the collision detector detects the presence of an interfering signal on the communication channel during transmission of the message at step 210, the collision detector commands the fax pump to terminate the transmission at step 212. The collision detector then continues to monitor the communication channel until it has been determined that the interfering signal has disappeared at step 202. Once the channel is clear, the collision detector retransmits the message starting at step 204.

In another embodiment, signal detector 106 in FIG. 3 also includes a signal demodulator. When a signal is detected in the error signal r(t), the demodulator decodes the signal and determines the content of the response from fax machine 122. This response is passed to controller 104. Then, based on this response and the current state in the T.30 fax protocol, controller 104 decides whether to retransmit the last message, wait, or send a new message to fax machine 122.

II. Second Embodiment

Figure 6:
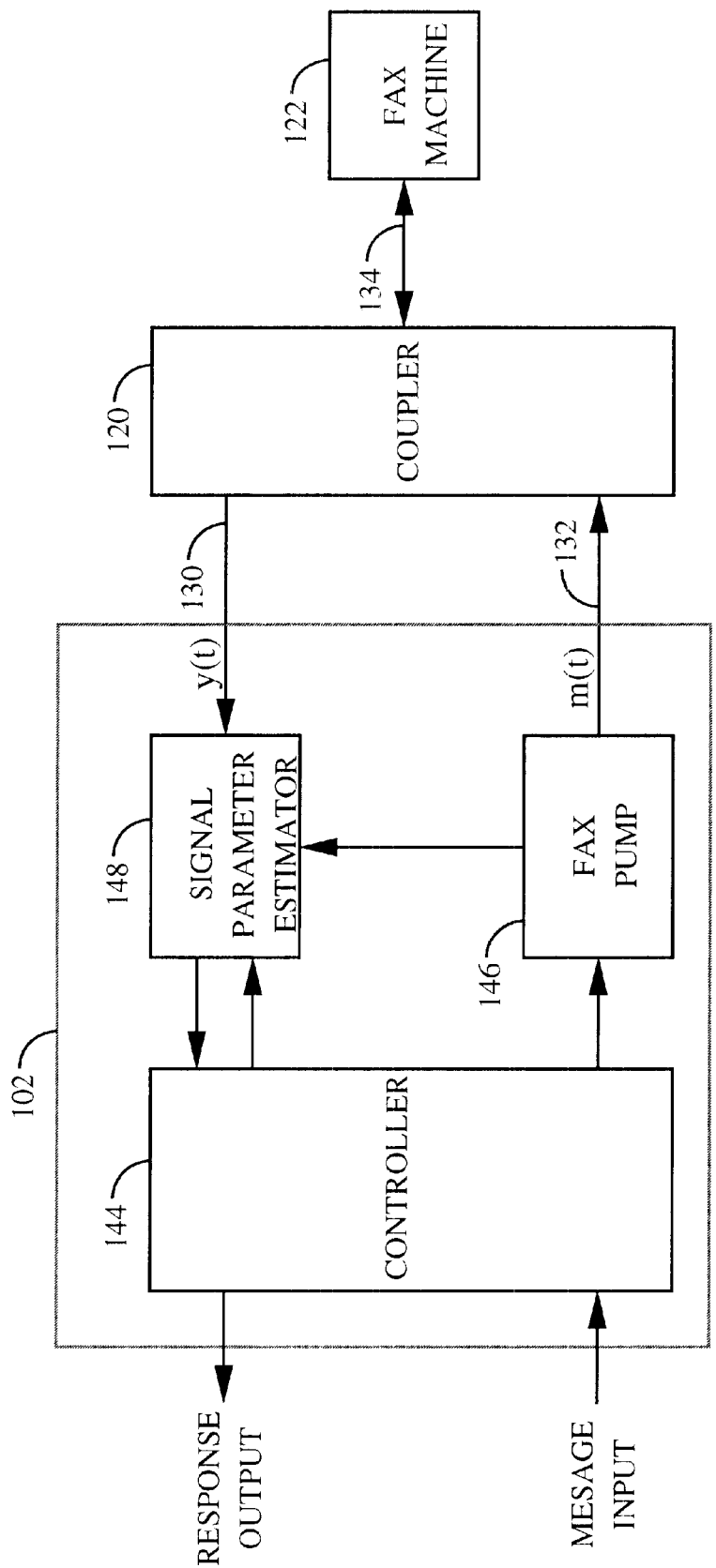
FIG. 6 is a block diagram of a parametric collision prevention/detection circuit.

In the second embodiment, a parametric collision detector is utilized to detect message collisions. An exemplary parametric collision detector is shown in FIG. 6. In this embodiment, parametric collision detector 102 connects in series with the communication channel between the fax machines. Collision detector 102 resides within SSS phone 16 and/or base station 22 (see FIG. 2) and is labeled as collision prevention/detection circuit 40 in FIG. 2. In the preferred embodiment, one collision detector 102 is assigned to each of the two communication fax machines 12 and 30. For clarity, the following discussion is limited to the communication between collision prevention/detection circuit 40a and fax machine A 12 in FIG. 2 which are renumbered as collision detector 102 and fax machine 122 in FIG. 6. The same interaction also occurs between collision prevention/detection circuit 40b and fax machine B 30.

Referring to FIG. 6, parametric collision detector 102 resides within SSS phone 16. Collision detector 102 receives messages from SSS phone 16 and sends responses to SSS phone 16. Collision detector 102 connects to coupler 120 through forward channel 132 and reverse channel 130. Coupler 120 can be a 2-to-4 wire converter or any other hybrid coupler capable of performing the function herein described and is typically an adapter connected to the interface of SSS phone 16. Fax machine 122 connects to coupler 120 through communication channel 134 such as an RJ-11 interface. Coupler 120 couples the messages on forward channel 132 to fax machine 122 and the responses from fax machine 122 to reverse channel 130.

Within collision detector 102, controller 144 connects to fax pump 146. Controller 144 may be implemented in one of many manners described previously in the first embodiment. Fax pump 146 modulates the digital data from controller 144 and transmits the modulated signal as messages on forward channel 132. Signal parameter estimator 148 connects to controller 144, fax pump 146, and reverse channel 130. Signal parameter estimator 148 receives the digital data from fax pump 146 and the signal on reverse channel 130 and determines whether a message collision has occurred based on these two inputs. Signal parameter estimator 148 also receives a control signal from controller 144 which commands signal parameter estimator 148 into a train mode or a monitor mode. Finally, signal parameter estimator 148 provides a status signal to controller 144 to indicate the presence or absence of a message collision.

Sending a message from controller 144 to fax machine 122 occurs in the same manner in the second embodiment as in the first embodiment. If controller 144 needs to transmit a message to fax machine 122, controller 144 first determines if communication channel 134 connected to fax machine 122 is clear. To determine this, controller 144 uses the status signal from signal parameter estimator 148. Controller 144 proceeds only after it has been determined that the communication channel is clear and that there is no potential for message collisions.

Based on the type of the message to be sent to fax machine 122 and its a priori knowledge of the T.30 fax protocol, controller 144 knows whether it is possible to receive a response from fax machine 122 while fax pump 146 is transmitting the message. If no response is anticipated from fax machine 122, a message collision is highly unlikely and controller 144 sends a control signal to signal parameter estimator 148 to command signal parameter estimator 148 into the train mode. Controller 144 then sends the digital data to fax pump 146. Fax pump 146 receives the digital data, modulates the data, and transmits the modulated signal as a message on forward channel 132. Coupler 120 couples a predominant portion of the message from forward channel 132 to communication channel 134 connected to fax machine 122. Again, due to imperfections in the implementation of coupler 120, a small and distorted version of the message appears on reverse channel 130. This echo from the message is the only signal present on reverse channel 130 since it has just been determined, before the transmission of the message, that the communication channel is clear.

In the train mode, signal parameter estimator 148 monitors the echo on reverse channel 130 as fax pump 146 transmits the message. The digital data comprising the message is also sent by fax pump 146 to signal parameter estimator 148. Thus, during the training period, signal parameter estimator 148 has the digital data and the echo corresponding to the digital data. Signal parameter estimator 148 computes the values for various predetermined parameters of the echo. As an example, signal parameter estimator 148 can compute the energy of the echo within different frequency bands. The energy measurement at each frequency band would then be mapped to a distinct parameter of the echo. The computed values, e.g. the energy measurements at different frequency bands, are then equated to the digital bits that produced in those computed values. Thus, after signal parameter estimator 148 has been trained, signal parameter estimator 148 is able to predict what the computed values for the parameters should be, based solely on the digital data from fax pump 146. Signal parameter estimator 148 uses the predicted values to create sets of threshold values for these parameters, one set of threshold values for each parameter, and each set of threshold values forming a threshold range.

If controller 144 expects a possible response from fax machine 144 while fax pump 146 is transmitting a message, controller 144 sends a control signal to signal parameter estimator 148 to command signal parameter estimator 148 into the monitor mode. By monitoring reverse channel 130, signal parameter estimator 148 is able to detect the presence of interfering signals, such as a response from fax machine 122. In the monitor mode, signal parameter estimator 148 receives the signal y(t) on reverse channel 130, computes the various parameters for the signal y(t), and compares the computed values to the threshold values. If the communication channel is clear of interfering signals, the signal y(t) on reverse channel 130 will only contain the echo of the message. The computed values for the various parameters for the echo will fall within the threshold range and signal parameter estimator 148 will output a status signal to controller 144 indicating no message collision.

If fax machine 122 transmits a response to controller 144 during transmission of the message, the signal y(t) on reverse channel 130 would contain the echo plus the interfering signals. The computed values for the total signal will be different than that of the echo alone. If the computed values falls outside the threshold range, signal parameter estimator 148 outputs a status signal to controller 144 indicating the high likelihood of a message collision. Controller 144, upon receipt of the status signal indicating the high likelihood of a message collision, terminates transmission of the message, continuously monitors the status signal, and retransmits the messages at a later time after it has been determined that the communication channel is clear. Thus, signal parameter estimator 148 is able to detect message collisions on the communication channel regardless of the source of the message collision.

By utilizing a parametric collision detector to detect collisions in the messages being transmitted to fax machine 122 and retransmitting the messages at a later time when the channel is clear, a reliable communication between controller 144 and fax machine 122 is possible.

Figure 7:
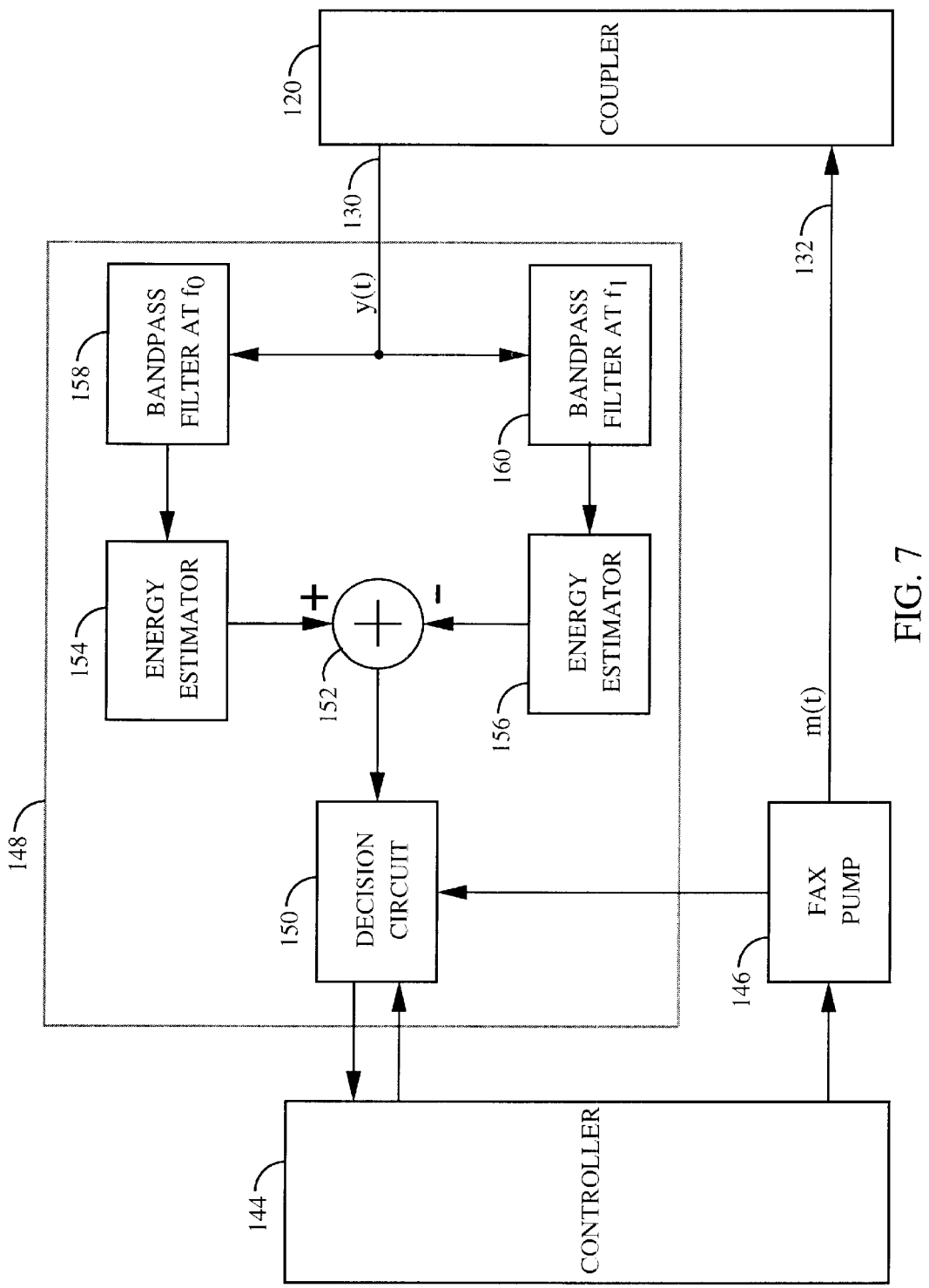
FIG. 7 is a block diagram of an exemplary parametric signal detector circuit.

An exemplary signal parameter estimator based on the energies at two frequency bands is shown in FIG. 7. For V.21 messages and responses, binary frequency shift keying (BFSK) is used to modulate the data bits corresponding to the messages. The modulation function is performed by fax pump 146. A digital zero is represented by a 3.3 msec burst of 1850 Hz tone and a digital one is represented by a 3.3 msec burst of 1650 Hz tone. By measuring the energy of the modulated signal at these two frequencies, a prediction can be made as to what data bits are transmitted on the communication channel.

The energy measurements at two frequency bands can also be used to determine the presence of message collisions on a communication channel due to the fact that the energy signature of an echo is different from the energy signature of an echo plus a response. For example, if communication channel 134 is clear, the signal on reverse channel 130 is composed predominately of the echo of the message on forward channel 132. Signal parameter estimator 148 measures the energy at the two frequency bands ($f_0=1850$ Hz and $f_1=1650$ Hz) for each transmitted data bit. The two energy measurements for each data bit form an energy signature for that bit. The energy measurements of the echo which result from the transmission of a digital zero on forward channel 132 contain a high energy measurement at $f_0=1850$ Hz and a low energy measurement at $f_1=1650$ Hz. Alternately, the energy measurements of the echo which result from the transmission of a digital one contain a high energy measurement at $f_1=1650$ Hz and a low energy measurement at $f_0=1850$ Hz. Thus, the energy signature of the echo resulting from a digital zero transmission is different than the energy signature of a digital one transmission. The energy signatures measured during the training period are used to generate two sets of threshold values, one set for a digital zero transmission and another set for a digital one transmission. For example, the energy signature of the echo resulting from a digital zero transmission results in an upper and a lower threshold value for $f_0=1850$ Hz and an upper and a lower threshold value for $f_1=1650$ Hz. The energy signature for a digital one transmission also results in a set of four threshold values. The threshold values are selected such that the energy measurements of the echo alone will fall within the upper and lower thresholds. The four threshold values for each data bit form a threshold range for that bit. The energy signatures of the signal on the communication channel during subsequent message transmissions are compared against the two threshold ranges.

If the signal on reverse channel 130 contains the echo and a response from fax machine 122, the energy signature of the echo plus the response will be different than the energy signature of the echo alone. Assuming that the response is also a V.21 message, which is true in most situation of interest, the echo and the response may add constructively or destructively. Therefore, the energy measurements at $f_0=1850$ Hz and $f_1=1650$ Hz of the echo plus the response will deviate from the expected energy signature of the echo alone. By comparing the energy signature of the echo plus the response to the threshold range for the data bit being transmitted, a message collision can be determined if the measured energy signature falls outside the threshold range.

Multiple threshold ranges comprised of additional upper and lower threshold values can also be used to allow detection of message collisions with varying degree of confidence. Also, energy measurements at more than two frequency bands can also be use to allow a more accurate detection of the echo and the response. More frequency bands create a more complex energy signature and enable the resolution of other spectral components. The use of multiple ranges and multiple frequency bands, and other similar variations, are within the scope of the present invention.

In the preferred embodiment, the energy measurements at the two frequency bands are differentially combined into one combined energy value. This implementation has the advantage of simplicity but results in some loss in accuracy. The energy measurement from $f_1=1650$ Hz is subtracted from the energy measurement at $f_0=1850$ Hz. Thus, during the training period in which only the echo of the message is being measured, the energy measurement of the echo resulting from the transmission of a digital zero results in a high energy measurement ($E_{f0}$) at $f_0=1850$ Hz and a low energy measurement ($E_{f1}$) at $f_1=1650$ Hz. Differentially combining the energy measurements ($E_{f0}-E_{f1}$) yields a positive combined energy value for a digital zero. Alternately, the energy measurement of the echo resulting from the transmission of a digital one results in a high energy measurement at $f_1=1650$ Hz and a low energy measurement at $f_0=1850$ Hz. Differentially combining the energy measurements ($E_{f0}-E_{f1}$) yields a negative combined energy value for a digital one.

The combined energy values measured during the training period are used to generate two sets of threshold values. For example, the combined energy value of the echo resulting from a digital zero transmission results in an upper and lower threshold value centered about a positive value. The combined energy value for a digital one transmission also results in a set of two threshold values centered about a negative value. The threshold values are selected such that the combined energy value of the echo alone falls within the upper and lower thresholds. The two threshold values for a digital zero transmission form one threshold range and the two threshold values for a digital one transmission form another threshold range. The combined energy values of the signal on the communication channel during subsequent message transmissions are compared against the two threshold ranges.

If the signal on reverse channel 130 contains the echo plus a response from fax machine 122, the combined energy value for the echo and the response will be different than the combined energy value of the echo alone. By comparing the combined energy value of the echo plus the response to the threshold range for the data bit being transmitted, a message collision is indicated if the combined energy value falls outside the threshold range. Thus, with a priori knowledge that the message and the response transmissions on the same frequency is highly unlikely, a signal parameter estimator which measures the energy at two subcarrier frequencies can be used to detect message collisions.

The parametric collision detector of the preferred embodiment which is based on the difference in energies at two frequency bands is shown in FIG. 7. Referring to FIG. 7, bandpass filters 158 and 160 are connected to reverse channel 130 to enable collision detector 148 to monitor communication channel 134 (not shown in FIG. 7). Bandpass filters of various types (e.g. Butterworth, Gaussian, or Chebychev), order, implementations (e.g. analog or digital filters), and bandwidths are all within the scope of the present invention. Bandpass filters 158 and 160 filter the signal on reverse channel 130 at two different frequencies, $f_0$ and $f_1$, respectively, and output the filtered signals to energy estimators 154 and 156. In the preferred embodiment, $f_0$ and $f_1$ correspond to the two subcarrier frequencies used to frequency shift keying (FSK) modulate a digital zero ($f_0=1850$ Hz) and a digital one ($f_1=1650$ Hz), respectively.

Energy estimators 154 and 156 compute the energy of the filtered signals from bandpass filters 158 and 160, respectively. The energy calculation can be performed with analog circuits or computed digitally. The outputs from energy estimators 154 and 156 are then routed to summer 152 which differentially combines the signals. Summer 152 can be implemented with a differential amplifier, an arithmetic logic unit, or other signal combining means. The combined energy value from summer 152 is routed to decision circuit 150. Decision circuit 150 also receives the data bits corresponding to the transmitted message from fax pump 146 and a control signal from controller 144. Decision circuit 150 outputs a status signal to controller 144 indicating the presence or absence of a message collision.

Decision circuit 150 is commanded into a train mode or a monitor mode by controller 144 through the control signal. When controller 144 determines that a message collision is unlikely based on the type of the message to be transmitted and its a priori knowledge of the T.30 fax protocol, controller 144 commands signal parameter estimator 148 into the train mode. In the train mode, decision circuit 150 monitors the combined energy values from summer 152 and equates the combined energy values to the data bits which resulted in the echo. Since it has been determined that the communication channel is clear before placing decision circuit 150 into the train mode, the combined energy values from summer 152 will be composed predominately of the echo only. Thus, after having been trained, decision circuit 150 is able to predict what the combined energy value for the echo should be for a digital zero or a digital one transmission. Decision circuit 150 then creates two sets of threshold values, one set of threshold values for a digital zero transmission and another set of threshold values for a digital one transmission. Each set of threshold values contains an upper and a lower threshold value. The threshold values are a function of the predicted combined energy value for each bit being transmitted. The threshold values are then used later to determine the presence or absence of message collisions. The combined energy values from summer 152 can take on positive and negative values.

During transmission of the message when a message collision is possible, controller 144 commands signal parameter estimator 148 into the monitor mode. In this mode, signal parameter estimator 148 measures the energy of the signal on reverse channel 130. The signal on reverse channel 130 is composed of the echo of the message being transmitted and interfering signals on communication channel 134. The interfering signal can be a response from fax machine 122. Decision circuit 150 receives the data bits from fax pump 146, recalls the threshold values corresponding to each data bit being transmitted, and compares the combined energy value from summer 152 to the threshold values. If the combined energy value falls within the threshold range, decision circuit 150 declares no message collision has occurred. If the combined energy value falls outside the threshold range, decision circuit 150 declares that there is a high likelihood of a message collision. As discussed previously, multiple sets of threshold values can be used to allow indication of a message collision with varying degree of confidence. Decision circuit 150 sends the appropriate status signal to controller 144 indicating the condition. Upon receipt of the status signal from decision circuit 150 indicating a high likelihood of a message collision, controller 144 commands fax pump 146 to terminate transmission of the message and retransmits the message at a later time after it has been determined that the communication channel is clear.

Figure 8:
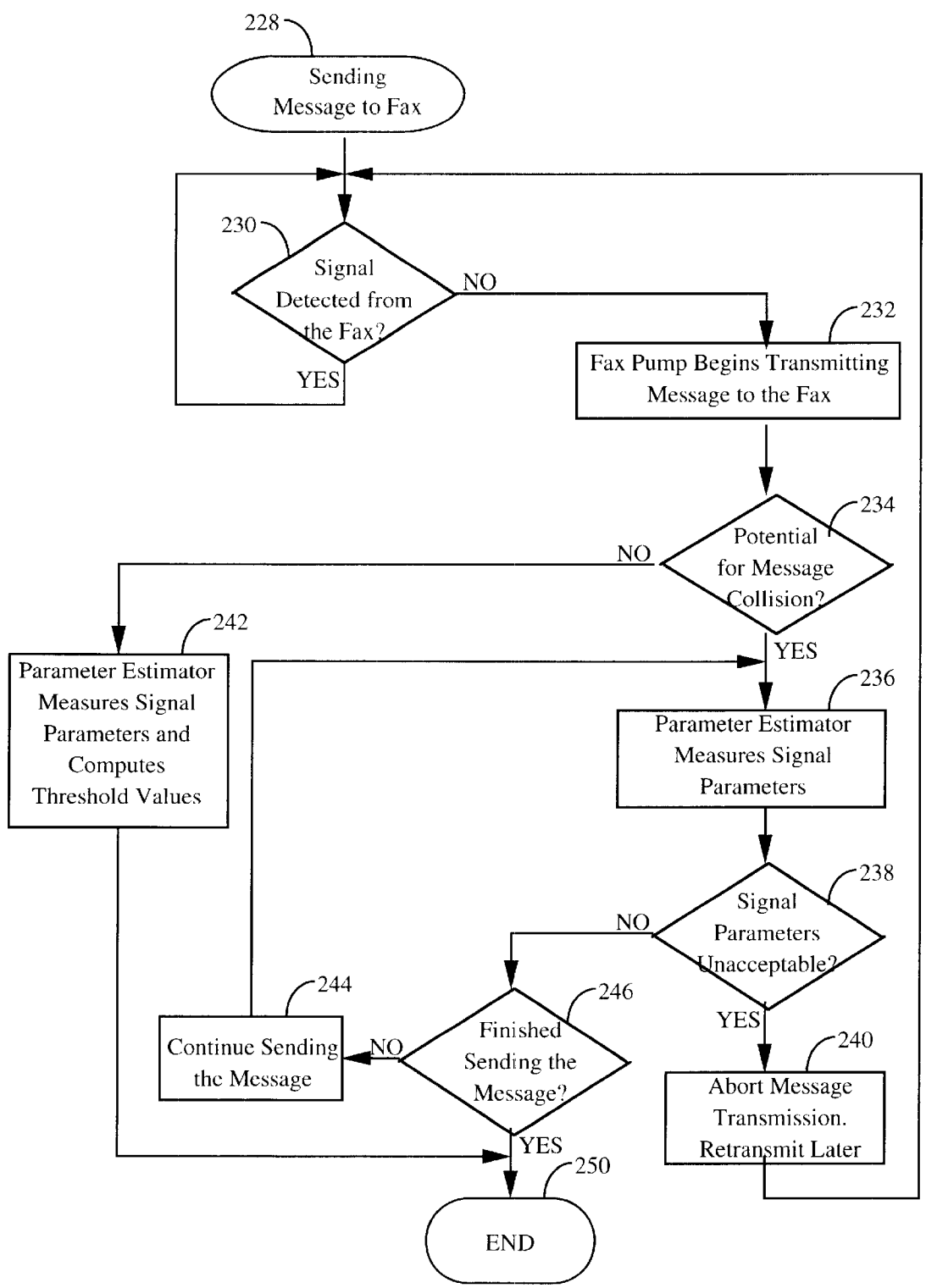
FIG. 8 is a flow diagram of a parametric collision detection method of the present invention.

A flow diagram detailing the operation of the parameter collision detector of the second embodiment is shown in FIG. 8. Initially, the collision detector has a message to send to the fax machine at state 228. The collision detector first checks the communication channel connected to the fax machine to determine whether the channel is clear at step 230. If the channel is not clear, the collision detector continues to monitor the channel and will proceed only after it has been determined that the channel has become clear.

The collision detector then begins transmitting the message to the fax machine at step 232. At step 234, upon transmission of the message, the collision detector analyzes the message to determine whether it is possible to receive a response from the fax machine while fax pump 146 is transmitting the message. The collision detector is able to determine this based on its knowledge of the type of the message and its a priori knowledge of the T.30 fax protocol. If no response from the fax machine is expected, the potential for collision is minimal. The signal parameter estimator is then placed into the train mode while the message is transmitted to the fax machine at step 242.

In the train mode, the signal parameter estimator monitors the echo on the reverse channel and computes the values for various parameters of the echo. The signal parameter estimator then equates the computed values to the data bits corresponding to the echo and creates sets of threshold values for these parameters. The new threshold values update the previous threshold values within the signal parameter estimator. The train mode continues until transmission of the message is complete. The process terminates upon completion of the transmission of the message at state 250.

If the collision detector determines that it is possible to receive a response from the fax machine, the signal parameter estimator is commanded into the monitor mode. The collision detector then enters into a loop to continually check for message collision during the transmission of the message. In the first step of the loop, the signal parameter estimator computes the values for various parameters of the signal on the reverse channel to determine the presence of an interfering signal on the communication channel at step 236. The interfering signal can be a response from the fax machine. If the computed values are within the threshold values for these parameters, no message collision has occurred. The collision detector then determines whether transmission of the message has been completed at step 246. If the transmission is not complete, the collision detector continues to transmit the message at step 244 and returns to step 236. The process terminates upon determination that the complete message has been transmitted at state 250.

If the collision detector detects the presence of an interfering signal on the communication channel during transmission of the message at step 238, the collision detector commands the fax pump to terminate the transmission at step 240. The collision detector then continues to monitor the communication channel until it has been determined that the communication channel is clear. When the channel is clear, the collision detector retransmits the message starting at step 230.

The collision prevention/detection circuits in FIGS. 3 and 6 and the flow diagrams in FIGS. 5 and 8 can be implemented in a variety of methods. The inventive concept can be implemented in hardware using a state machine, some memory, and a clock. The invention can also be implemented in firmware by microcode running on a microcomputer or a digital signal processor. Other implementations or a hybrid combination of implementations are within the scope of the present invention.

Although the exemplary embodiment is directed toward a fax communication system operating in a half-duplex manner over the PSTN, the inventive concept is applicable toward any communications between multiple devices using a half-duplex communication system. For example, the present invention can be directed toward communications between computers, fax machines, scanners, plotters, and printers, copiers, test equipment, and diagnostic equipment.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method at a source for detecting a message collision on a half-duplex communication channel between the source and a destinations comprising the steps of:

determining whether a message that is to be transmitted over the half-duplex communication channel requires a response;

generating an error signal over a training period if the message does not require a response, wherein the message is transmitted during the training period;

generating an error signal over a monitoring period if the message does require a response, wherein the message is transmitted during the monitoring period; and determining the presence of a message collision if the error signal over the monitoring period exceeds the error signal over the training period by a threshold amount.

2. The method of claim 1, further comprising the steps of:

determining a probability of message collision by examining the threshold amount, wherein different threshold amounts correspond to different probabilities of message collisions; and ending the transmission of the message if the probability is high.

3. The method of claim 1, wherein the error signal is in the form of an energy value.

4. The method of claim 1, wherein the error signal is a difference between an echo of the message and an estimation of the echo of the message.

5. The method of claim 4, wherein the error signal over the training period is determined using an updated adaptive filter and the error -signal over the monitoring period is determined using a fixed adaptive filter.

6. A method for detecting message collisions in a half-duplex communication system, comprising the steps of:

filtering at least one message echo at a source device to provide at least one filtered signal;

measuring an energy level associated with each of said at least one filtered signal to determine an energy signature of said at least one message echo during a training period; and determining the presence of a message collision if the energy signature of said at least one message echo changes during a monitoring period, wherein the monitoring period is for receiving responses on a half-duplex communication channel.

7. The method of claim 6, wherein filtering at least one message echo at a source device to provide at least one filtered signal is performed at two frequency bands so that two filtered signals are provided to form two energy levels.

8. The method of claim 7, further comprising the step of differentially combining two energy levels associated with the two filtered signals to provide a combined energy value as the energy signature.

9. The method of claim 6, wherein determining the presence of a message collision if the energy signature of said at lest one message echo changes during a monitoring period comprises the steps of:

comparing said energy signature to at least one threshold level; and if said energy signature exceeds the at least one threshold level, then determining the presence of a message collision.

* * * * *